United States Patent [19]
Yoshikawa et al.

[11] 3,711,654
[45] Jan. 16, 1973

[54] MAGNETIC RECORDING AND REPRODUCING DEVICE FOR USE WITH AN ENDLESS RECORDING MEDIUM WITH MEANS FOR INDICATING A RECORDABLE STATE WITH-IN ONE CYCLE OF THE ENDLESS RECORDING MEDIUM

[75] Inventors: Minoru Yoshikawa, Kawasaki; Masaaki Ishii, Tokyo, both of Japan

[73] Assignee: Canon Kabushiki Kaisha, Tokyo, Japan

[22] Filed: April 24, 1970

[21] Appl. No.: 31,575

[30] Foreign Application Priority Data

| | | |
|---|---|---|
| April 30, 1969 | Japan | 44/34350 |
| Dec. 25, 1969 | Japan | 45/2388 (utility model) |
| Dec. 25, 1969 | Japan | 45/2389 (utility model) |
| Dec. 25, 1969 | Japan | 45/2391 (utility model) |
| Dec. 25, 1969 | Japan | 45/2392 (utility model) |
| Dec. 25, 1969 | Japan | 45/2393 (utility model) |

[52] U.S. Cl. ....................179/100.2 S, 179/100.2 Z
[51] Int. Cl. ....................G11b 15/04
[58] Field of Search...179/100.2 Z, 100.2 S; 274/4 B, 274/4 D, 11 B, 11 D

[56] References Cited

UNITED STATES PATENTS

| | | | |
|---|---|---|---|
| 3,601,558 | 8/1971 | Sugaya et al. | 179/100.2 Z |
| 2,466,514 | 4/1949 | Vagtborg | 179/100.2 Z |
| 3,494,528 | 2/1970 | Suzuki et al. | 274/4 B |
| 3,037,093 | 5/1962 | Nowlan | 179/100.2 D |
| 2,834,928 | 5/1958 | Carter | 179/100.2 S |
| 3,009,024 | 11/1961 | Eash | 179/100.2 Z |

*Primary Examiner*—Stanley M. Urynowicz, Jr.
*Assistant Examiner*—Robert S. Tupper
*Attorney*—Ward, McElhannon, Brooks & Fitzpatrick

[57] ABSTRACT

A magnetic record-reproduce device using an endless magnetic recording medium. This device provides a time setting means carried by the cartridge and corresponding to a length of time within one cycle of movement of the recording medium, and detection means connected to said time setting means when the cartridge is fitted in operative position, said detecting means being adapted to provide a control signal in accordance with said time setting means when recording is effected on said magnetic recording medium, thereby detecting whether recordable condition is established.

15 Claims, 13 Drawing Figures

FIG. 6-A
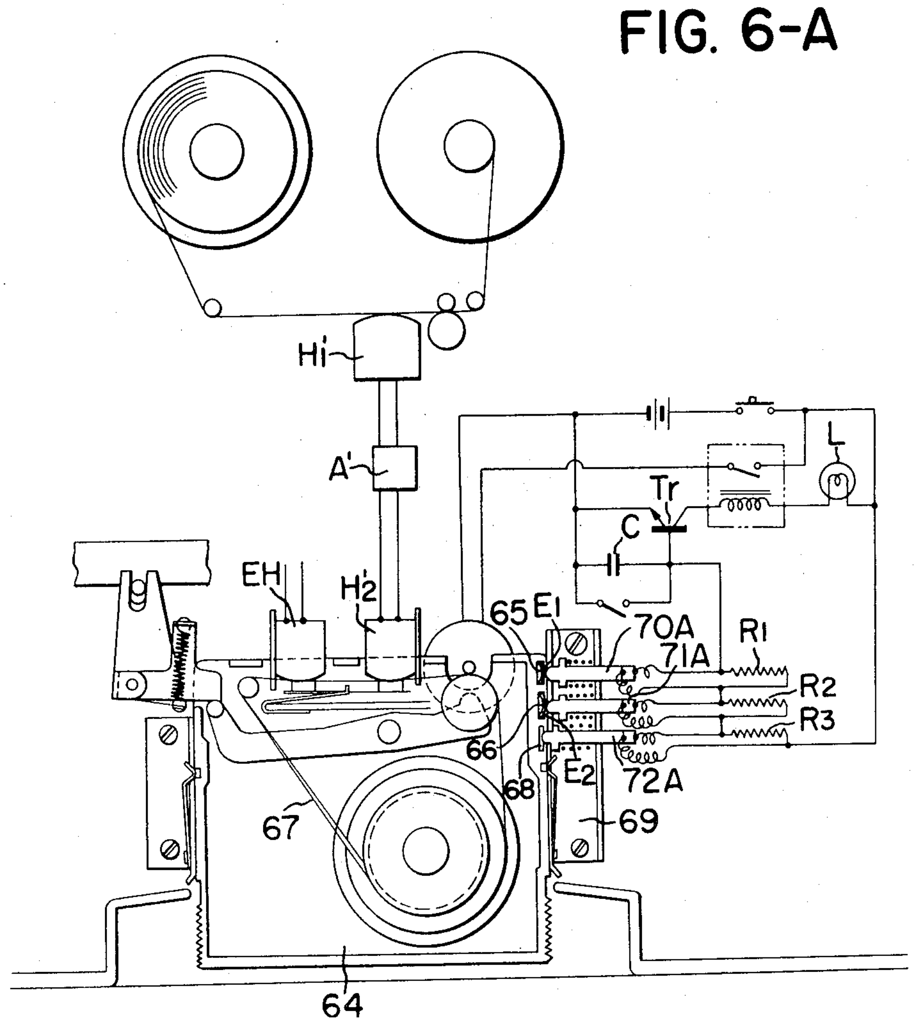
FIG. 6-B
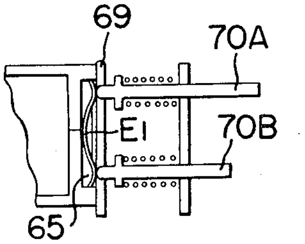

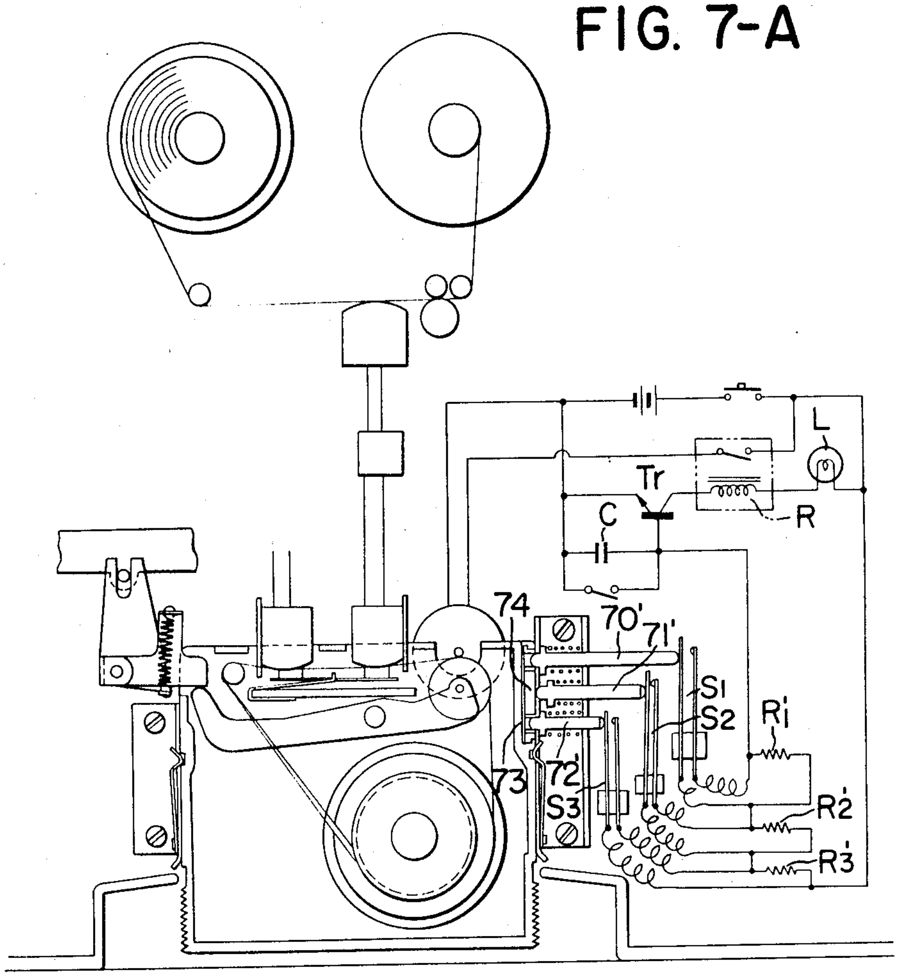
FIG. 7-A
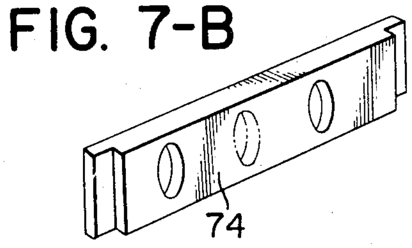
FIG. 7-B

MAGNETIC RECORDING AND REPRODUCING DEVICE FOR USE WITH AN ENDLESS RECORDING MEDIUM WITH MEANS FOR INDICATING A RECORDABLE STATE WITH-IN ONE CYCLE OF THE ENDLESS RECORDING MEDIUM

BACKGROUND OF THE INVENTION

1. Field of the Invention

This invention relates to a magnetic record-reproduce device, and more particularly to a magnetic record-reproduce device using an endless magnetic recording medium.

2. Description of the Prior Art

In recording some specific information on an endless magnetic recording medium, such as a moving endless magnetic tape, the endless tape can only record information in one cycle of movement, and if the endless tape is further moved for recording, that part of the information which has once been recorded on the endless tape during the first cycle of movement thereof will be erased by the eraser head which is provided adjacent to the recording head while some other part of the information is newly recorded on the same endless tape. In this way, the recording operation taking place during a second or further cycle of movement of the endless tape is exposed to the drawback that the necessary information recorded on that tape during the preceding cycle of movement might be erased by mistake.

To eliminate such a disadvantage, the prior art has heretofore proposed, for example, the provision of a conductive foil piece attached to the endless magnetic tape at a certain point thereof and a switch for detecting such a conductive foil piece to intermittently interrupting the current from the drive source of the endless tape. According to this prior art system, when the endless tape makes one complete cycle of movement, the conductive foil piece attached to the tape closes the switch to thereby stop the drive source and accordingly stop the endless tape from moving, whereby the endless tape is prevented from making any further movement other than one cycle of movement. In other words, any information exceeding the quantity corresponding to the entire length of the endless tape is not recorded on that tape and the necessary information once recorded on the same tape during the first cycle of movement can never be erased.

This known system, however, requires that the endless magnetic tape be initially positioned so that the conductive foil piece attached thereto also provides the starting point of the endless tape. Otherwise, the switch for detecting the conductive foil piece would fail to detect the foil piece when the endless tape has made a complete cycle of movement and this would result in an ineffective use of the endless tape during the first cycle of movement.

Thus, according to the prior art, the recording of information on an endless magnetic tape has required a procedure of initially setting the tape to its starting position indicated by the conductive foil piece, and for each recording operation, has meant a great encumbrance to the operator of the device.

Another conventional system using an endless magnetic tape has required the provision of an additional or master tape which is capable of a relatively long-time record and play-back. The information stored in this pre-recorded tape is reproduced and transferred to the endless magnetic tape, and is then played back as often as desired so that the transferred information may be repeatedly reproduced so as to enable a learner or student to listen to the same information. This system is known as being useful for a teaching machine of foreign language or music training or for the so-called dictation machine. Again, the system of this type suffers from the disadvantage that the initially recorded information may be erased to prevent the complete transfer of the desired information to the endless tape if the quantity of the information stored in the pre-recorded master tape exceeds the maximum limit available for the entire length of the endless tape.

Together with the above-described system, there has been proposed a system whereby the record-reproduce track of the endless magnetic tape is divided into two halves, i.e. a first half track portion directed to the recording of the transferred information and a second half track portion directed to the student's exercise practice, so that the student can listen to the information recorded in the first half track portion of the endless tape and then orally repeat that information as part of his own practice while recording this oral practice of his own in the second half track portion. Thereafter, the student or learner may be able to compare the two recorded materials to find out his errors or faults in his own recorded practice. Thus, the student can repeat such a process by playing back the endless tape again and again so as to correct and train himself with a higher efficiency. Again in this case, if the transferred information recorded on the endless tape should exceed the first half track portion of the entire endless tape, the second half track portion is reduced thereby and the student will not be able to practice and record his own exercise in a full degree and at the same speed as the given information. To prevent such inconvenience, certain special considerations must be given so that the transferred information can be recorded within the first half track portion of the endless tape.

In addition to such a disadvantage, another disadvantage resulting from the use of an endless magnetic medium, such as an endless magnetic tape, is that if the transferred information is recorded on the endless tape within one half of its entire length and if the other half of the endless tape stores therein some other pre-recorded information, the endless tape will, when played back, reproduce not only the transferred or necessary information but also the unnecessary pre-recorded information which may provide an undesirable effect similar to ordinary noises which make the reproduced information very hard to recognize. This additional disadvantage especially forms a further drawback in the magnetic record-reproduce device for educational purposes which uses both a pre-recorded master tape and an endless magnetic medium such as an endless magnetic tape, for recording the information transferred from the master tape. With such a device, it is often the case that the transferred information is recorded within the entire length of the endless tape and, if the endless tape still stores some other pre-recorded information than the transferred information, such unnecessary pre-recorded information is repeatedly reproduced together with the necessary transferred information, when the endless tape is played back. This makes the reproduced information quite unagreeable and hard to hear and greatly hampers the student's will to learn.

SUMMARY OF THE INVENTION

It is an object of the present invention to eliminate all the above described disadvantages and drawbacks inherent in the prior art arrangements and provide a novel magnetic record-reproduce device which can record desired information on an endless magnetic recording medium over a predetermined circumferential distance, such as the entire circumference or a half thereof.

It is another object of the present invention to provide a magnetic record-reproduce device which can record only desired information within the entire circumference of an endless magnetic recording medium while completely removing any other information than that desired information.

It is still another object of the present invention to provide a cartridge which contains therein a replaceable endless magnetic recording medium and which is provided with a time setting means corresponding to the length of time required for the endless magnetic recording medium to make one cycle of movement, said time setting means being adapted to set a time control means in the magnetic record-reproduce device when the cartridge is fitted in place within the device whereby only desired information may be recorded on the endless magnetic recording medium with the aid of the time setting means.

It is yet another object of the present invention to provide a magnetic record-reproduce device for educational purposes which uses a pre-recorded tape having stored therein the information to be transferred and an endless magnetic recording medium, and in which only the information to be transferred from the pre-recorded tape can be recorded on the endless magnetic recording medium while any other unnecessary information or noise can be removed from the endless magnetic recording medium.

It is yet still another object of the present invention to provide a magnetic record-reproduce device for educational purposes using a pre-recorded tape having stored therein the information to be transferred and an endless magnetic recording medium and in which the information stored in the pre-recorded tape is sequentially transferred to the endless magnetic recording medium while the user of the device can record on the endless magnetic recording medium only the information he has orally exercised to learn and can remove any other unnecessary information or noise that may remain on the endless medium, whereby only the information to be given and corresponding oral exercise practice can be recorded and reproduced by the endless magnetic recording medium.

Other objects and features of the present invention will become fully apparent from the following detailed description of the invention when it is read in conjunction with the accompanying drawings.

BRIEF DESCRIPTION OF THE DRAWINGS

FIG. 6–A is a diagrammatic representation showing another modification of the FIG. 3 device;

FIG. 6–B is a detail of the cartridge time setting means applied to the device of FIG. 6–A;

FIG. 7–A is a diagrammatic representation showing a further modification of the FIG. 3 device;

FIG. 7–B is a perspective view showing the cartridge time setting means applied to the device of FIG. 7–A;

DESCRIPTION OF THE PREFERRED EMBODIMENTS

Figure 1:
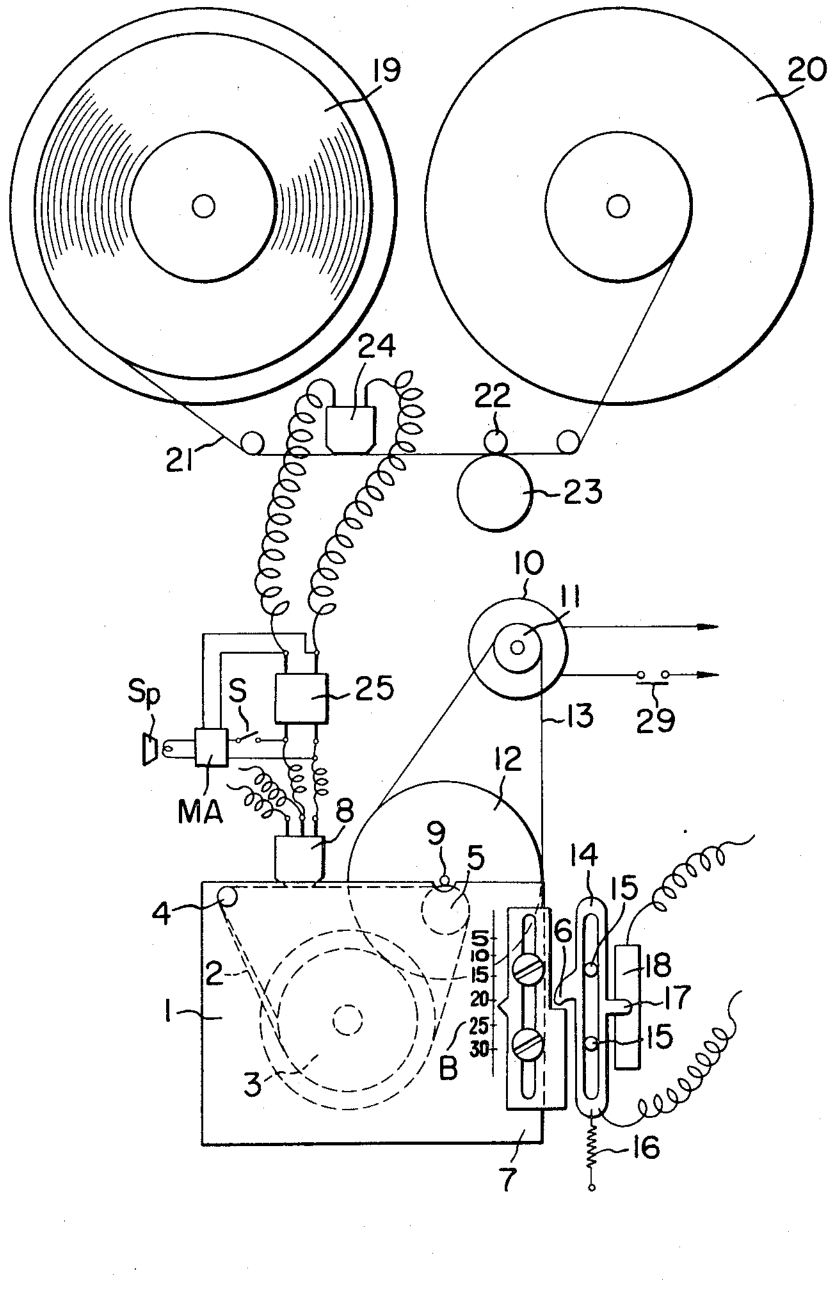
FIG. 1 is a diagrammatic representation of a magnetic record-reproduce device which is capable of indicating the amount of movement of the endless tape during one cycle of its movement according to the present invention.

Referring to FIG. 1, there is shown an example of the device of the present invention as applied to a magnetic record-reproduce apparatus for transferring the information stored in a pre-recorded master tape wound on an open reel to an endless tape. The device includes a cartridge 1 containing therein an endless magnetic recording tape 2 and fitted within a cartridge receiving recess during the operation of the device. The tape 2, which has its forward and trailing ends joined together to form an endless tape, is tensioned on a reel 3 rotatably mounted within the cartridge 1, a guide roll 4 and a pinch roll 5.

On the right-hand side of the cartridge 1 there is a tape length setting means 7 having a notch 6 whose position is adapted to be set in accordance with the length of time required for the entire length of the endless tape 2 to make one complete cycle of movement. The tape length setting means 7 is secured to the cartridge 1 by screw means in such a manner that a marking provided on the setting means 7 is in accordance with an indicium provided on the cartridge for showing the length of time required for the endless tape 2 to make one cycle of movement. Thus, the notch 6 is positioned in accordance with the entire length of the tape 2.

There is also shown a magnetic head assembly 8 which consists of an eraser head portion (left-hand side of the head assembly as viewed in FIG. 1) and a record-reproduce head portion (right-hand side). A capstan 9 is provided for moving the endless magnetic tape 2 and it is driven by a motor 10 through an endless belt 13 connecting a pulley 11 rotatably mounted on the drive shaft of the motor 10 with a fly wheel 12 supporting the capstan 9.

As shown in FIG. 1, the cartridge 1 is fitted in place within the device so that the tape 2 moving in the space provided by the front recess of the cartridge is urged into engagement with the magnetic head assembly 8 and capstan 9 by a cartridge pressing means (not shown).

A slidable means 14 is provided for detecting the position of the notch formed in the tape length setting means 7 provided in the cartridge 1, and this detection means 14 is guided along pins 15 studded in the base plate of the device. The detection means 14 is set in position by a spring 16 when the cartridge 1 is fitted in the device.

A portion of the detection means 14 provides a contact actuator 17 which is slidable on a fixed resistor 18. Thus, the contact actuator 17 and fixed resistor 18 together form a variable slide resistor and each of these has a lead terminal. A tape supply reel 19 and a take-up reel 20 are provided to supply a master tape 21 storing the information to be given and take up the master tape 21, respectively. The master tape 21 is driven to move by a capstan 22 and a pinch roll 23, so that the information stored in the master tape 21 is read out by a magnetic head 24 and carried to the magnetic head assembly 8 through an amplifier 25. Thus, the information in the pre-recorded master tape 21 is transferred therefrom to the endless magnetic tape 2 in the cartridge 1.

Figure 2:
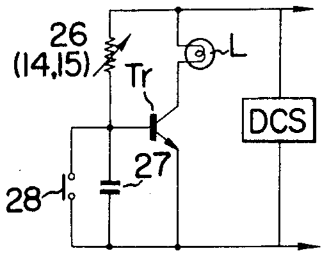
FIG. 2 shows a control circuit applied to the device of FIG. 1.

Referring now to FIG. 2, a variable resistor 26 defined by the aforesaid detection means 14 and resistor 18 together, is connected in series with a capacitor 27, and the connection point thereof is connected with the base pole of a transistor T*r*. A switch 28 connected in parallel with the capacitor 27 is a normally closed switch which is actuated in association with a drive switch 29 (FIG. 1) for the motor 10 when the master tape 21 is moved. An alarm lamp L is connected with the collector channel of the transistor T*r* with which is also connected a direct current source DCS. The magnetic head 24 is connected with a mixer-amplifier MA so that signals reproduced by the magnetic head 24 are amplified by the amplifier MA and thereafter vocalized by a speaker Sp. The record-reproduce head portion of the magnetic head assembly 8 is connected with the input of the mixer-amplifier MA through a switch S adapted to close only when the endless tape 2 is played back.

In operation, the cartridge 1 is first placed in its operative position within the magnetic record-reproduce device as shown in FIG. 1. The endless magnetic tape is thus urged into engagement with the magnetic head assembly 8 and capstan 9. The tape length setting means 7 sets the detection means 14 in position against the force of the spring 16, so that the variable resistor 26 is set to a resistance value corresponding to the length of the endless tape 2 or preferably to the length of time for one cyclic movement of the endless tape 2.

If the master tape 21 is then moved in the rightward direction, the switch 29 will be closed and the short-circuiting switch 28 opened, whereby the motor 10 starts rotating and thereby the endless tape 2 is driven through the capstan 9. As the result, the pre-recorded information in the master tape 21 is reproduced by the magnetic head 24 and applied to the record-reproduce head portion of the magnetic head assembly 8 through the amplifier 25. Thus, the endless tape 2 begins to record the information stored in the master tape 21 while any pre-recorded information remaining in the endless tape itself is erased by the eraser head portion of the magnetic head assembly 8. Also, the signals transferred to the endless tape 2 by the magnetic head 24 are amplified by the mixer-amplifier MA and then vocalized by the speaker Sp.

On the other hand, the time control circuit shown in FIG. 2 starts to add up the time as the two tapes 2 and 21 move, and a charging current starts to flow into the capacitor 27 through the resistor 26. Since a length of time slightly shorter than the time required for the tape 2 to make substantially one cycle of movement is set up in accordance with the time constant of the resistor 26 and capacitor 27, the transistor Tr is switched on to turn on the alarm lamp L just before the endless tape 2 completes one cycle of movement.

When the alarm lamp L is turned on, the operator of the device may stop the tapes 2 and 21 with the result that the endless tape 2 keeps therein the desired information alone without any possibility of such recorded information being erased. Thus, double recording can be completely prevented. In the meantime, the operator can continue the transfer of the information from the master tape 21 to the endless tape 2 while listening to the transferred information reproduced through the speaker Sp. Therefore, if the master tape 21 does not contain any more information to be transferred, the operator can forward the tape 21 alone by a fast forwarding means (not shown). After the alarm lamp L turns on, the tapes 21 and 2 are stopped from running and then the switches 21 and S only are closed to move the endless tape 2 alone. The transferred signals reproduced by the magnetic head 8 are amplified by the mixer-amplifier MA. In this instance, only the desired information is recorded on the endless tape 2 within its one cycle of movement and this enables the operator to repeatedly listen to the necessary information.

Figure 4:
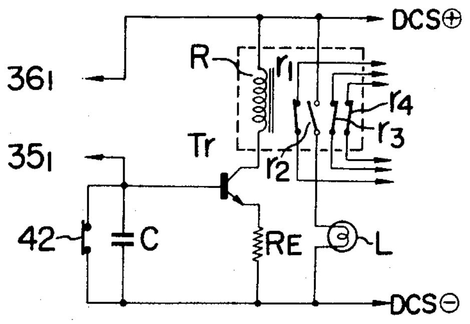
FIG. 4 shows a control circuit applied to the device of FIG. 3.
Figure 3:
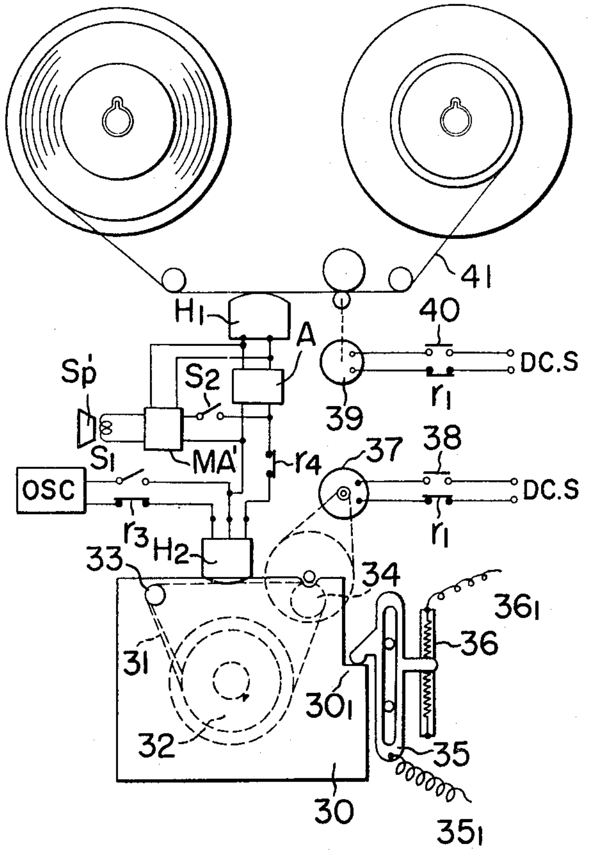
FIG. 3 is a diagrammatic representation of a magnetic record-reproduce device which is capable of indicating the amount of movement of the endless tape during its one cycle of its movement and automatically stopping the endless tape according to the present invention.

FIGS. 3 and 4 show a modified example of the present invention in which the endless tape can automatically stop running when it has made one cycle of movement. In FIG. 3, a cartridge 30 contains therein an endless magnetic tape 31 which is tensioned on a reel 32 mounted for rotation within the cartridge 30, as well as contains a guide roll 33 and a pinch roll 34, both provided in the cartridge. In the side wall $\mathbf{30}_1$ of the cartridge 30 there is formed a time setting portion consisting of a recess corresponding to the length of time required for one cyclic movement of the endless tape 31. Detection means 35 is provided for detecting the time setting portion $\mathbf{30}_1$ of the cartridge 30 when the cartridge is fitted in the device. The detection means 35 is formed of a conductor and is adapted to slide on a resistor 36, and together with the resistor 36, forms a variable resistor. A motor 37 for driving the endless tape 31 is connected with a direct current source DCS through an operating switch 38 and contact $r_1$ of a relay R to be described. Another motor 39 for driving a tape 41 is connected with a direct current source DCS through an operating switch 40.

Wires are led out of the detection means 35 and resistor 36 and are connected in a parallel circuit of a capacitor C and starting switch 42 which is opened in association with the operating switches 38 and 40. As in the circuit of FIG. 2, the time constant of the capacitor C and variable resistors 35 and 36 is set to the length of time for one cyclic movement of the endless tape 31 when the variable resistors are controlled by fitting the cartridge 30 in place.

A transistor Tr has its base pole connected with the capacitor C and has its collector channel connected with a relay R whose normally closed contact $r_1$ is connected with the motors 37 and 39. Another contact $r_2$ of the relay R which is normally open, is connected with an alarm lamp L. A magnetic head $H_1$ engageable with a master tape 41 is a reproduce head, and signals reproduced by this head $H_1$ are amplified by a record amplifier A and then applied to a record-reproduce head $H_2$. The latter head $H_2$ contains an eraser head therein. When the record-reproduce head $H_2$ is in recording position, an erasing current is applied thereto from a high frequency circuit OSC through a switch $S_1$ adapted to close during the information transfer from the tape 41 to the tape 31, and also through the normally closed contact $r_3$ of the relay R. The relay R is further provided with a normally closed contact $r_4$ which is connected with the record-reproduce head circuit within the magnetic head $H_2$.

With this arrangement, an operating button (not shown) is depressed to close the switches 38 and 40 and thereby start the motors 37 and 39. Thus, in the same way as described with respect to the FIG. 1 embodiment, the pre-recorded information stored in the master tape 41 is transferred therefrom to the endless tape 31 and at the same time the signals transferred from the magnetic head $H_1$ are amplified by a mixer-amplifier MA′ and then vocalized by a speaker S*p*.

Upon initiation of the operation, the normally closed switch 42 is opened in association with the depression of the operating button and this causes the capacitor C to be charged through the variable resistors 35 and 36. Simultaneously therewith, the switch S is closed again in association with the depression of the operating button to allow an erasing current to flow into the eraser head portion of the magnetic head $H_2$ so that any information pre-recorded in the endless tape 31 is erased and the information from the master tape 41 is recorded on the tape 31. When the endless tape 31 completes its one cycle of movement, the capacitor C also completes its charging to increase the emitter potential of the transistor Tr. Thus, the transistor Tr is switched on to energize the relay R. As the result, the contacts $r_1$, $r_3$ and $r_4$ are changed over into OFF position while the contact $r_2$ is changed over into ON position, so that the drive motors 37 and 39, and accordingly the master tape 41 and endless tape 31, are all stopped from running. At the same time, the alarm lamp L is turned on to indicate that the endless tape 31 has been stopped.

In this way, the endless tape 31 can record only the desired information over the entire length thereof and there is no possibility that double recording can take place to erase the necessary information. In this case, the eraser head portion and record-reproduce head portion of the magnetic head $H_2$ have their respective erasing and recording operations interrupted because the contacts $r_3$ and $r_4$ are disconnected. Therefore, no double recording is effected on the endless tape 31 and this eliminates the necessity of taking the trouble to stop the endless tape 31. However, there is a need to find out where in the tape 31 the start of the recorded information takes place when the tape 31 is played back, and in order to meet such need the endless tape 31 may very advantageously be once stopped when it has made substantially one cycle of movement, whereafter the device may be brought into play-back position so that the tape 31 can be immediately played back from the starting point thereof where the recorded signals start. To reproduce the transferred information thus recorded on the endless tape 31, a repeat button (not shown) is depressed to close the switches 42, 38 and $S_2$ and open the switch 40 so as to move the endless tape 31 alone. Thus the information recorded on the endless tape 31 is reproduced by the magnetic head $H_2$, amplified by the mixer-amplifier MA′ and vocalized by the speaker S*p*′.

Figure 5:
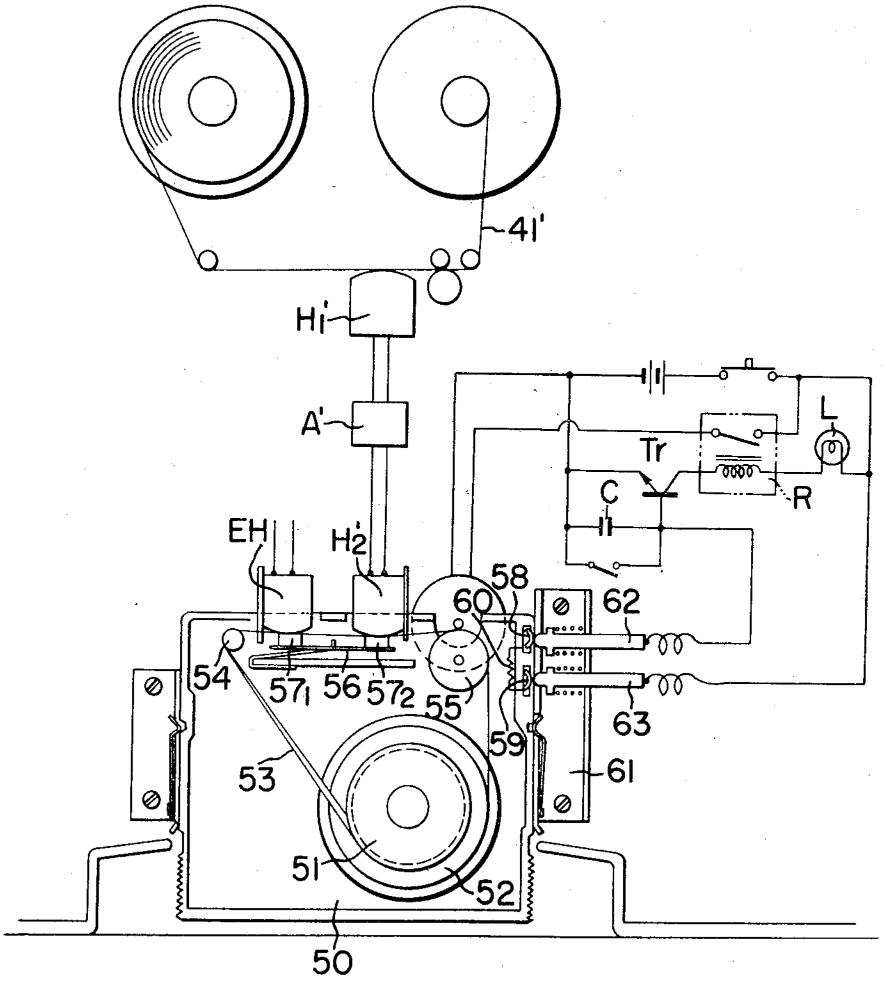
FIG. 5 is a diagrammatic representation showing a modification of the FIG. 3 device.

FIG. 5 shows a modification of the embodiment shown in FIGS. 3 and 4. This modified example is different from the previous examples in that the variable resistor is provided within the cartridge integrally therewith instead of being disposed outside the cartridge. The cartridge assembly of this alternative embodiment consists of a cartridge 50, a tape reel 51 rotatably mounted within the cartridge 50, a reel flange 52 formed integrally with the reel 51, and an endless tape 53 tensioned on the reel flange 52, a guide roll 54 and a pinch roll 55. The cartridge assembly further includes a support plate 56 for supporting pads $57_1$ and $57_2$. Such a construction of the endless tape cartridge is known to the prior art. In the right-hand side wall of the cartridge 50 there are formed recesses having electrode members 58 and 59 bonded thereto. These electrode members 58 and 59 are connected with a resistor 60 disposed within the cartridge 50. A cartridge holding member 61 formed of an insulating material is provided to hold the cartridge 50 when the latter is fitted in place within the device. There are also provided detection electrodes 62 and 63 resiliently mounted so as to be brought into abutment with the electrode members 58 and 59 when the endless tape cartridge 50 is fitted in place. In the front side wall of the cartridge 50 there are provided two openings into which are respectively received a record-reproduce head $H_2$, and eraser head EH, to which is applied a reproduce signal from a reproduce head $H_1'$ engageable with a master tape 41′ through a record amplifier A′. The heads $H_2'$ and EH thus received into the openings in the front side wall of the cartridge 50 are allowed to engage the endless tape 53. The eraser head EH is connected with a high frequency circuit (not shown) so that a current for erasing any pre-recorded signal on the endless tape 53 and recording the transferred signals thereon may be applied to the eraser head EH.

The resistance value of the resistor 60 disposed within the cartridge 50 is selected in accordance with the time constant of the capacitor C in the control circuit so that the velocity used for the endless tape in the cartridge is substantially equal to the time required for that tape to make one cycle of movement. Therefore, if there are prepared various cartridges each containing an endless tape having the required length and if a resistor 60 having a resistance value corresponding to the entire length of the endless tape or the length of time required for one cyclic movement of the endless tape is provided in the cartridge, then there is an advantage that a cartridge for use with a desired quantity of information can be provided with a desired length of endless tape corresponding to the resistor in the cartridge and having a different selected resistance value.

FIGS. 6–A and 6–B show another example of the time setting means provided for the cartridge. Similarly to the case of FIG. 5, the cartridge has recesses formed in a side wall thereof and electrode members are selectively embedded in the recesses in accordance with the length of the endless tape.

In FIGS. 6–A and 6–B, the cartridge 64 containing an endless tape 67 therein has a plurality of recesses 65, 66 and 68 formed in a side wall thereof. Electrode members $E_1$ and $E_2$ are embedded in the recess 65 and 66 respectively. A cartridge holding member 69 formed of an insulating material is provided to hold the cartridge when the latter is fitted within the device. Pairs of detection electrodes 70A and 70B, 71A and 71B, and 72A and 72B, as shown in FIG. 6–B, are provided to resiliently engage the respective recesses 65, 66 and 68 in the cartridge 64 when the latter is fitted in place. Between the respective pairs of detection electrodes, i.e. between 70A and 70B, 71A and 71B, and 72A and 72B, there are inserted fixed resistors $R_1$, $R_2$ and $R_3$ which are connected in series with the respective pairs of detection electrodes.

The resistance values of the resistors $R_1$ to $R_3$ are selected so that the time constant of the capacitor C connected in series with the resistors corresponds to the length of time required for the endless tape in use to make one cycle of movement, and one of the resistors $R_1$ to $R_3$ is selectively connected with the capacitor C in accordance with the position of the electrode members provided in the side wall of the cartridge.

In the embodiment of FIG. 6–A, the electrode members provided in the side wall of the cartridge 64 are embedded only in the recesses 65 and 66 and this causes the resistors $R_1$ and $R_2$ to be connected in series with the capacitor C when the cartridge 64 is fitted in place, so that the endless tape 67 effects one cycle of movement during the length of time corresponding to $(R_1+R_2)C$.

Figure 8:
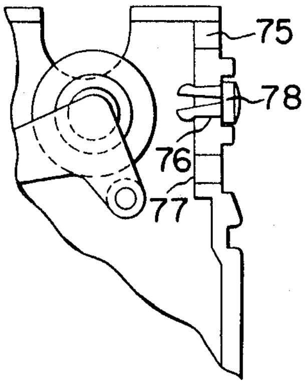
FIGS. 8 and 9 are partial sectional views showing further examples of the time setting means shown in FIG. 7–B.
Figure 9:
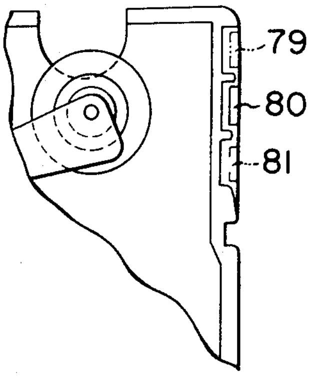

Instead of the arrangement shown in FIG. 6–A and 6–B, it is also possible to construct the time setting means as shown in FIGS. 7–A and 7–B. In this case a single recess 73 is formed in the right-hand side wall of the cartridge for receiving therein a time setting means 74 having apertures selectively formed in accordance with the length of time for one cyclic movement of the endless tape. The presence of the apertures in the time setting means 74 is detected by detection means 70', 71' or 72' when the cartridge is fitted in place, whereby contact $S_1$, $S_2$ or $S_3$ is selectively closed to selectively connect time constant setting resistors $R_1'$ to $R_3'$ with the capacitor C. The time setting means provided for the cartridge may also take such a form as a time setting member 78 which is inserted selectively in one of the apertures formed in the side wall of the cartridge, as shown in FIG. 8. Alternatively, the time setting means may take the form of pawl members 79 to 81 formed integrally with the side wall of the cartridge as shown in FIG. 9, and two of these pawl members (for example, 79 and 81 in FIG. 9) are selectively removed in accordance with the length of the endless tape contained in the cartridge.

Figure 10:
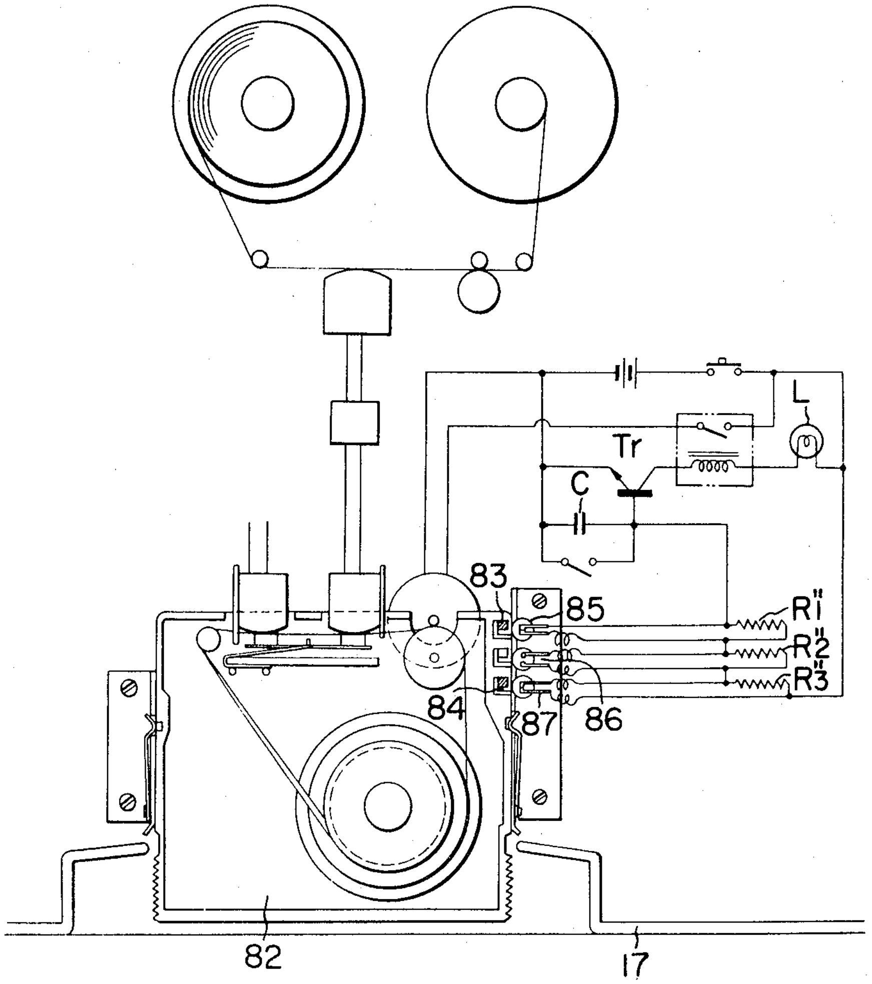
FIGS. 10 and 11 are diagrammatic representations showing further modifications of the FIG. 3 device.

FIGS. 10 illustrates another example of the time setting means corresponding to the length of time for one cyclic movement of the endless tape. In this example one of magnetic elements is selectively used with the cartridge. As shown in FIG. 10, permanent magnets 83 and 84 are selectively embedded in the side wall of a cartridge 82 so that lead switch 85, 86 or 87 for selecting one of time constant resistor elements $R_1''$ to $R_3''$ provided in the device may be selectively actuated when the cartridge is fitted in place within the device, whereby desired one of the resistor elements $R_1''$ to $R_3''$ can be selected in accordance with the length of the endless tape in use. In this instance, however, the permanent magnets 83 and 84 should preferably be spaced apart from the running magnetic tape surface in order that the permanent magnets may not malaffect the magnetic tape moving in the cartridge.

Figure 11:
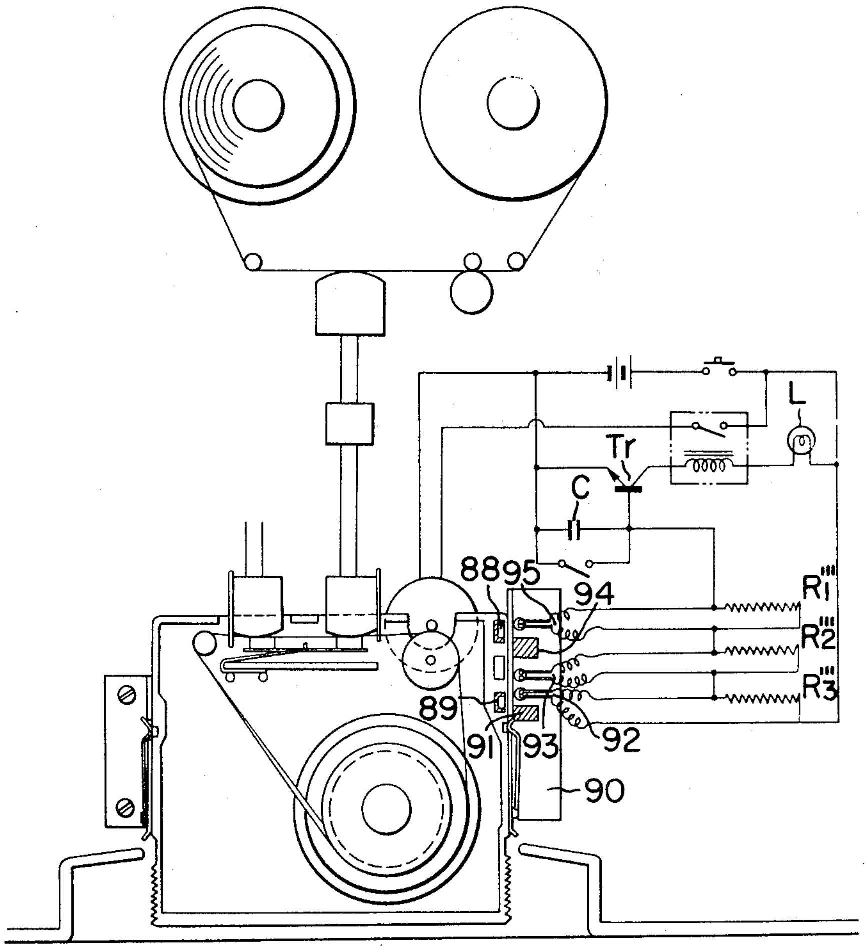

FIG. 11 shows a further example of the time setting means, which employs, in place of permanent magnets 83 and 84 of FIG. 10, ferromagnetic elements 88 and 89 selectively embedded in the recesses formed in the side wall of the cartridge. When the cartridge is placed in position, the ferromagnetic elements selectively act on permanent magnets provided on a cartridge holding member 90 and actuate lead switches 92 and 95 which come closest to the ferromagnetic elements among pairs of lead switches 92 to 95, whereby a resistor $R_2'''$ can be selectively connected with the capacitor C.

From the foregoing discussion it will be appreciated that the endless tape cartridge used with the present invention is so arranged that the length of time required for it to make one cycle of movement is preset by the time setting means provided for the cartridge. When the cartridge is placed in operative position, the detection means provided in the device and the time setting means provided in the cartridge cooperate together electromechanically or magnetically so as to control the time control circuit in the device.

Also, in the embodiments of FIGS. 1 and 3, especially in FIG. 1, if the information to be transferred from the master tape 21 is only of a quantity which can be covered within the entire length of the endless tape 2, the endless tape 2 can fully record the information while the remaining part of the endless tape can be free from any unnecessary information or noises because the magnetic head 8 is working in recording position and the eraser head portion thereof is acting to erase such unnecessary information or noises.

Thus, as it comes to the end of one cyclic movement and is stopped from moving by the alarm lamp L now turned on, the endless tape 2 stores only the desired information therein while completely shutting out any other information. This means that the endless tape 2, when played back, reproduces just only the desired information transferred from the master tape.

This fact holds true not only in the case of the information transfer-record system described above, but also in the case where use is made of an endless tape alone without any master tape so that desired information may be recorded in a part of the entire endless tape.

The illustrated embodiments of the present invention relate to the system whereby the lapse of time for one cyclic movement of the endless tape is indicated by alarm means or the endless tape automatically stops its movement upon termination of such time so that only the desired information may be recorded on the endless tape with no double recording provided therein. However, recording need not always take place during one cyclic movement of the endless tape but may take place during a half of one cycle of movement or only within a desired length of time. In such a case, the resistance value of the time constant elements provided within or outside the endless tape cartridge may be suitably selected so that recording is effected on a desired part of the endless tape. If the device of FIG. 3 is to be used for the purpose of learning, for example, foreign language conversation, there should be prepared a prerecorded tape 41 in which segments of information to be learned (each segment corresponds to about half the length of the endless tape 31) are stored, and the recess 33 in the endless tape cartridge is formed with the dimensions corresponding to a half cycle of movement of the endless tape. If the device is started for the record-reproduce operation, the endless tape 31 is moved until it is stopped when only a first segment of information material has been transferred from the tape 41 to the endless tape 31 over one half of the entire length thereof. Therefore, the learner can then play back only the endless tape 31 by an unshown circuit and repeatedly listen to the same segment of information if he wishes to do so. In this instance, it is further possible for the learner to provide an unrecorded track in the endless tape for the purpose of separately recording and reproducing his own oral practice, and thus he can orally repeat the given information so that his own oral practice may be recorded in that unrecorded track before the information transferred to the endless tape 31 is again reproduced. By doing so, the learner can continue his learning practice while comparing his own oral repetition practice with the transferred model information material during each cycle of movement of the endless tape 31. This will result in the learner's greater attainment of foreign language speaking and listening comprehension abilities.

While the invention has been shown and described with respect to the cartridge of the type self-containing an endless tape, it will readily be appreciated that use may be made of other types of cartridge such as those which contain a magnetic disc or drum rotatably mounted therein and serving as an endless magnetic recording medium. Also, the illustrated time setting means of the present invention uses a circuit having a C-R time constant circuit and one of resistors is selected by the recess, permanent magnet and other means provided in the side wall of the cartridge so that the selected resistor is connected with the capacitor to set the time constant of the time constant circuit, whereas the same result can of course be obtained by providing a plurality of capacitors so that the cartridge may select one of the capacitors instead of selecting one of the resistors.

As has been disclosed hitherto, according to the present invention, a time setting means provided in the endless tape cartridge acts to control the time control circuit of the device when the cartridge is placed in position, so that the termination of movement of the endless tape is automatically indicated or realized when the endless tape has made one or half cycle of movement or any other desired amount of movement. Thus, the endless tape can record and reproduce only the desired information in a desired portion thereof without allowing any double recording. This arrangement is highly useful when the recording medium in use is in an endless form such as an endless magnetic tape or the like.

It should further be noted that if the time setting means is provided and set in accordance with the length of time required for the endless tape to make one cycle of movement within the cartridge, desired information will be recorded on the endless tape during that cycle of movement while the eraser head acts to erase any unnecessary information pre-recorded in the other part of the endless tape than that part which has recorded the desired information. The endless tape can thus record the desired information alone and this means a very high effectiveness of the present invention when used with a magnetic record-reproduce device of the type which uses an endless tape, especially such a device applied to a learning or dictation machine.

What is claimed is:

1. A magnetic recording and reproducing arrangement for recording information on a predetermined part of an endless magnetic recording medium within one cycle thereof comprising in combination:

a magnetic recording and reproducing device and a detachable cartridge containing said endless magnetic recording medium, means in said device for receiving and holding said cartridge in an operative position, means in said device for driving said endless recording medium at a predetermined velocity, recording means in said device for recording information on said endless magnetic recording medium, said recording means being provided with a recording head disposed in opposed relationship with a plane of movement of said endless recording medium, time setting means provided on said cartridge for setting a predetermined time required for recording information on said predetermined part of said endless recording medium within one cycle thereof by said recording means, said time setting means including a member means related to the length of said predetermined time, detection means in said device cooperable with said member means of said time setting means when said cartridge is fitted in an operative position with said recording means, said detection means including an electronic timing network providing at least a timing control output after said predetermined time, said electronic timing network including a time constant circuit having at least one time constant element and adjustable by said time setting means to establish said predetermined time, and means for operating said electronic timing network when recording is effected on said endless recording medium by said recording means.

2. A magnetic recording and reproducing arrangement as claimed in claim 1, wherein said member means of said time setting means includes a first electrical element having an electric impedance corresponding to the length of time for movement of said endless magnetic recording medium within said cartridge, and said detection means further comprises an electrode provided adjacent to said time setting means of said cartridge when fitted in a loaded position, said electrode being arranged to electrically connect with said first electrical element in the cartridge loaded position, thereby to adjust the time constant of said time constant circuit to said predetermined time.

3. A magnetic recording and reproducing arrangement as claimed in claim 2, wherein said first electrical element is a resistor and said time constant element of the time constant circuit is a capacitor.

4. A magnetic recording and reproducing arrangement as claimed in claim 2, wherein said first electrical element is a conductive electrode whose electric impedance is substantially zero and the time constant circuit of said timing network consists of a resistor and a capacitor.

5. A magnetic recording and reproducing arrangement as claimed in claim 1, wherein said member means of said time setting means is a member having at least one step selectively formed in a wall of said cartridge in accordance with said predetermined time, and said detection means further comprises displaceable members resiliently urged and being displaced by said time setting means, said displaceable members being arranged to adjust the impedance of said time constant element, whereby said displaceable members are displaced by said at least one step when the cartridge is fitted in a loaded position, thereby selectively controlling the time constant of said time constant circuit in accordance with the length of time required to effect recording on said predetermined part of said endless magnetic recording medium within one cycle thereof.

6. A magnetic recording and reproducing arrangement as claimed in claim 5, wherein said time setting means comprises a plurality of removable pawls formed integrally with said wall of said cartridge, said pawls being selectively removed in accordance with said predetermined length of time.

7. A magnetic recording and reproducing arrangement as claimed in claim 5, wherein said time setting means comprises a plurality of recesses formed in said wall of said cartridge, and convex members selectively received into said recesses in accordance with said predetermined length of time.

8. A magnetic recording and reproducing arrangement as claimed in claim 1, wherein said member means of said time setting means has a mating stepped portion whose position is set in accordance with said predetermined length of time, said detection means further comprises a detection member having a projected portion engageable with said mating stepped portion, and said time constant element consists of a variable slide resistor connected to adjust with said detection member and a capacitor, whereby said projected portion of said detection member engages said stepped portion of said time setting means to adjust said variable resistor and set the time constant of the time constant circuit in said electronic timing network.

9. A magnetic recording and reproducing arrangement as claimed in claim 1, wherein said member means of said time setting means comprises at least one magnetic element selectively disposed in different positions, and said time constant circuit includes at least one magneto-sensitive switch provided in a position where said magnetic element can be disposed and electrically serially connected with said time constant element, said magnetic element being arranged to actuate said magneto-sensitive switch when said cartridge is fitted in a loading position, whereby said time constant element is connected in said time constant circuit.

10. A magnetic recording and reproducing arrangement as claimed in claim 9, wherein said magnetic element is a permanent magnet.

11. A magnetic recording and reproducing arrangement as claimed in claim 9, wherein said magnetic element is a ferromagnetic member, and a permanent magnet is provided adjacent to said magneto-sensitive switch, whereby said switch is actuated by magnetic flux passing from said permanent magnet through said ferromagnetic member when said cartridge is fitted in position to control the time constant of the time constant circuit.

12. A magnetic recording and reproducing arrangement for recording information on a predetermined part of an endless magnetic recording medium within one cycle thereof comprising in combination:

a magnetic recording and reproducing device and a detachable cartridge containing said endless magnetic recording medium, means in said device for receiving and holding said cartridge in an operative position, means in said device for driving said endless recording medium at a predetermined velocity, recording means in said device for recording information on said endless magnetic recording medium, said recording means being provided with a recording head disposed in opposed relationship with the plane of movement of said endless recording medium, time setting means provided on said cartridge for setting a predetermined time required for recording information on said predetermined part of said endless recording medium within one cycle thereof by said recording means, said time setting means including member means related to the length of said predetermined time, detection means in said device cooperable with said member means of said time setting means when said cartridge is fitted in an operative position with said recording means, said detection means including an electronic timing network providing at least a timing control output after said predetermined time, said electronic timing network including a time constant circuit having at least one time constant element and adjustable by said time setting means to establish said predetermined time, means for operating said electronic timing network when recording is effected on said endless recording medium by said recording means, and alarm means connected to the output of said timing network, whereby said alarm means indicates the end of the recordable condition on said predetermined part of said endless magnetic recording medium within one cycle thereof.

13. A magnetic recording and reproducing arrangement for recording information on a predetermined part of an endless magnetic recording medium within one cycle thereof comprising in combination:

a magnetic recording and reproducing device and a detachable cartridge containing said endless magnetic recording medium, means in said device for receiving and holding said cartridge in an operative position, means in said device for driving said endless recording medium at a predetermined velocity, recording means in said device for recording information on said endless magnetic recording medium, said recording means being provided with a recording head disposed in opposed relationship with the plane of movement of said endless recording medium, time setting means provided on said cartridge for setting a predetermined time required for recording information on said predetermined part of said endless recording medium within one cycle thereof by said recording means, said time setting means including a member means related to the length of said predetermined time, detection means in said device cooperable with said member means of said time setting means when said cartridge is fitted in an operative position with said recording means, said detection means including an electronic timing network providing at least a timing control output after said predetermined time, said electronic timing network including a time constant circuit having at least one time constant element and adjustable by said time setting means to establish said predetermined time, means for operating said electronic timing network when recording is effected on said endless recording medium by said recording means, and a control circuit connected between the output of said timing network and the driving means, for controlling said driving means, said control circuit including means for stopping said driving means after movement for said predetermined time.

14. A magnetic recording and reproducing arrangement for recording information on a predetermined part of an endless magnetic recording medium within one cycle thereof comprising in combination:

a magnetic recording and reproducing device and a detachable cartridge containing said endless magnetic recording medium, means in said device for receiving and holding said cartridge in an operative position, means in said device for driving the endless recording medium at a predetermined velocity, recording means in said device for recording information on said endless magnetic recording medium, said recording means being provided with a recording head disposed in opposite relationship with the plane of movement of said recording medium, time setting means provided on said cartridge for setting a predetermined time required for recording information on said predetermined part of said recording medium within one cycle thereof by said recording means, said time setting means including member means related to the length of said predetermined time, detection means in said device cooperable with said member means of said time setting means when said cartridge is fitted in an operative position with said recording means, said detection means including and electronic timing network providing at least a timing control output after said predetermined time, said electronic timing network including a time constant circuit having at least one time constant element and adjustable by said time setting means to establish said predetermined time, means for operating said electronic timing network when recording is effected on said endless recording medium by said recording means, and control means for stopping said recording means, said control means being electrically connected between said recording means and the output of said timing network, whereby said control means stops the recording operation after recording on said predetermined part of said endless magnetic recording medium.

15. A magnetic recording and reproducing device comprising in combination a cartridge and a magnetic recorder, said cartridge containing an endless magnetic 25 recording and having member means on a wall thereof which is related to a predetermined recording length of time within one cycle of said tape, said magnetic recorder comprising recording means, detection means cooperable with said member means when the cartridge is loaded in said magnetic recorder for detecting the extent of said predetermined recording length of time and timing control means responsive to said detection means and said recording means for providing at least a control output after said predetermined time, said timing control means being arranged to start its timing operation upon the start of the recording operation of said recording means and stop its timing operation after said predetermined time.

* * * * *

UNITED STATES PATENT OFFICE

CERTIFICATE OF CORRECTION

Patent No. 3,711,654 Dated January 16, 1973

Inventor(s) MINORU YOSHIKAWA and MASAAKI ISHII

It is certified that error appears in the above-identified patent and that said Letters Patent are hereby corrected as shown below:

Column 1, line 35, "to" should read --and--.

Column 16, line 38, after "recording" insert --tape--.

Column 16, line 38, delete "25".

Signed and sealed this 20th day of November 1973.

(SEAL)
Attest:

EDWARD M.FLETCHER,JR.
Attesting Officer

RENE D. TEGTMEYER
Acting Commissioner of Patents